April 11, 1961 C. B. LEACH ET AL 2,979,357
BUMPER-CONDUIT EXHAUST ASSEMBLY
Filed Sept. 27, 1956 2 Sheets-Sheet 2

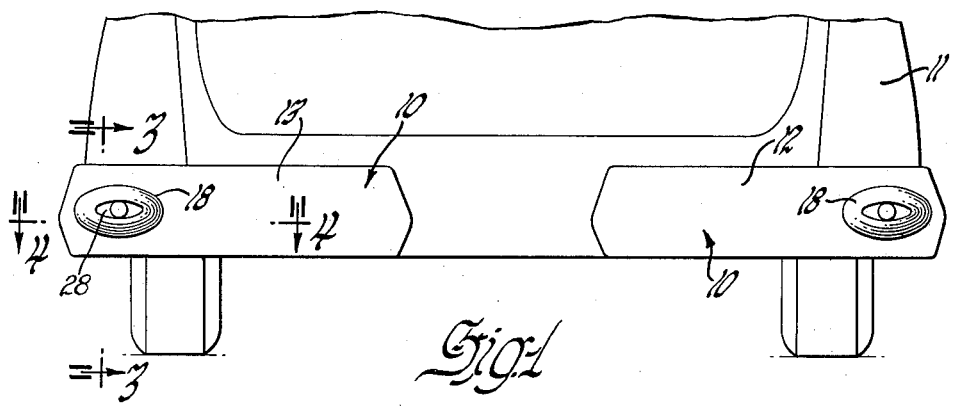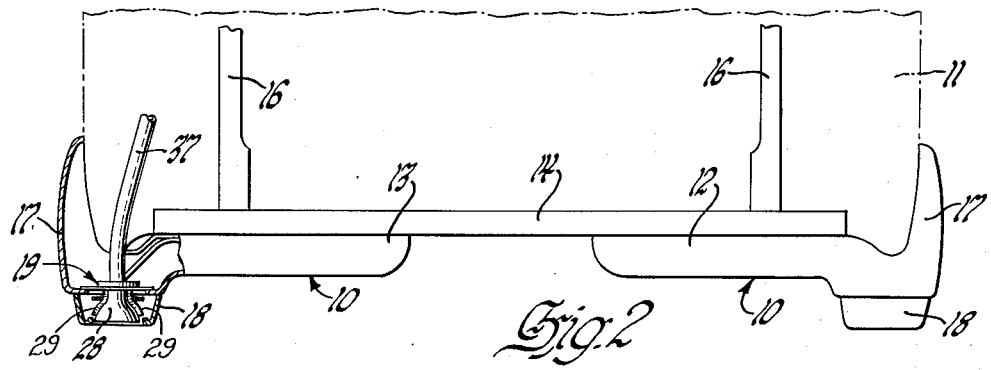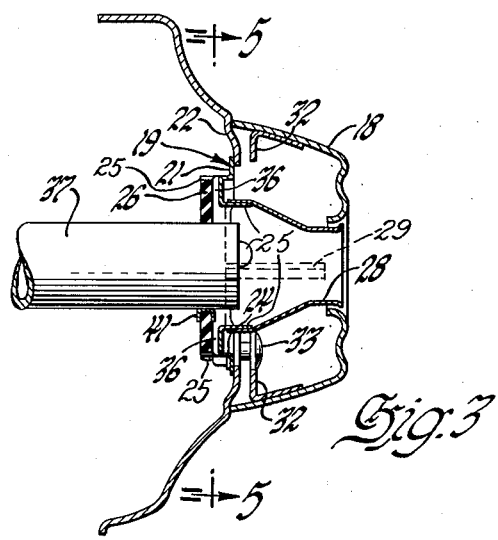

INVENTORS
LESTER V. OSTRANDER &
Clayton Blaine Leach
BY
L. D. Burch
ATTORNEY

2,979,357
BUMPER-CONDUIT EXHAUST ASSEMBLY

Clayton B. Leach and Lester V. Ostrander, Pontiac, Mich., assignors to General Motors Corporation, Detroit, Mich., a corporation of Delaware Filed Sept. 27, 1956, Ser. No. 612,476

9 Claims. (Cl. 293—69)

This invention relates to bumper exhaust structures especially applicable for use on motor vehicles and the like.

It is proposed to provide a simple, inexpensive and easily installed bumper exhaust structure which may be used on either end of a bumper and which may be installed in either of two positions on either end of such bumper without changing the appearance of the structure or the bumper and without effecting the operation of either.

In the drawing:

Figure 1 is a fragmentary rear end view of a motor vehicle having bumper exhaust structures embodying the principles of the invention.

Figure 2 is a fragmentary plan view of the rear end of the motor vehicle illustrated by Figure 1. A part of the vehicle is shown in cross section and other parts in broken lines to better illustrate the structure embodying the invention.

Figure 3 is a fragmentary cross sectional view of the rear bumper of the motor vehicle disclosed by Figures 1 and 2 and illustrating the bumper exhaust structure at one end of the bumper. Figure 3 is taken substantially in the plane of line 3—3 of Figure 1 looking in the direction of the arrows thereon.

Figure 4 is taken substantially in the plane of 4—4 of Figure 1 looking in the direction of the arrows thereon.

Figure 6 is taken substantially in the plane of 6—6 on Figure 4 looking in the direction of the arrows thereon.

Figure 4:
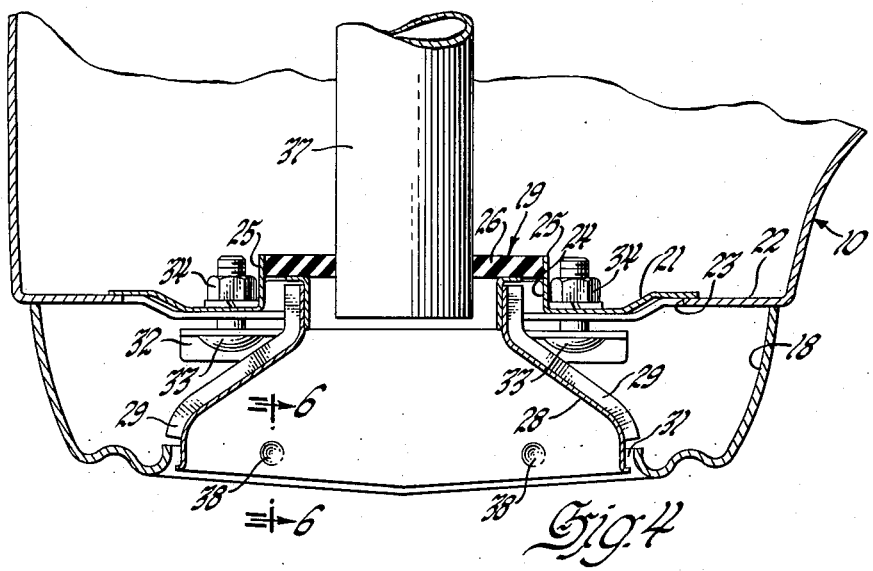
Figure 4 is a fragmentary horizontal sectional view of the bumper and bumper exhaust structure substantially as disclosed by the preceding figures of the drawing.
Figure 5:
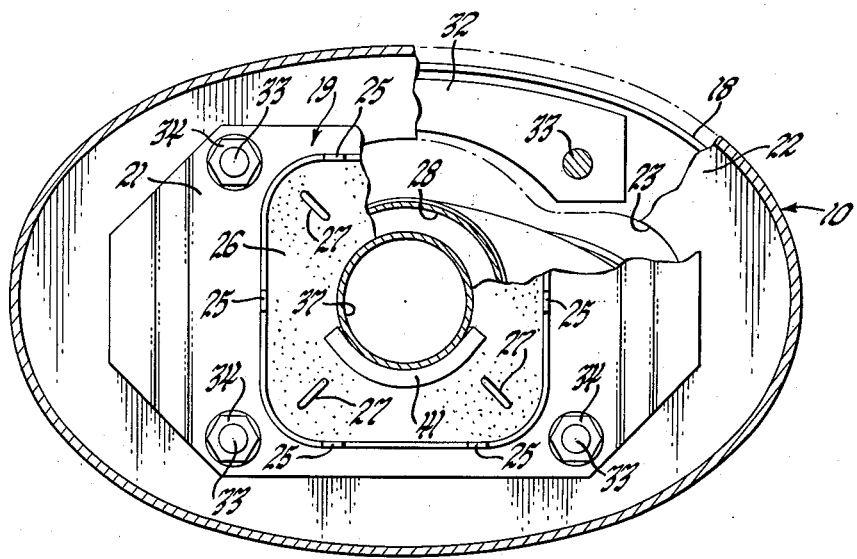
Figure 5 is a cross sectional view of the bumper and bumper exhaust structure taken in the plane of line 5—5 on Figure 3 and looking in the direction of the arrows thereon.
Figure 6:
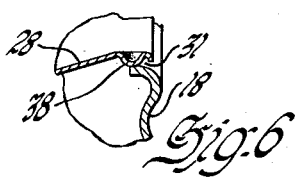
Figure 6 is a fragmentary cross sectional view of a spacing means which may be embodied in the structure disclosed by the preceding figures.

The invention may be embodied in a rear bumper 10 employed on a motor vehicle such as that indicated at 11. The bumper 10 may be constructed in any desired manner and may be formed of any number of parts secured to one another to provide a separate unit or secured separately or in different units to motor vehicle 11. In the present instance the bumper 10 is formed of section 12 and 13 secured rigidly to the transverse end member 14 connecting longitudinal members 16 forming parts of the frame of the motor vehicle 11. Each of the sections 12 and 13 of the bumper 10 may be formed of two parts, there being a support 17 and a shield 18 forming each of the sections 12 and 13. The exterior surfaces of the supports 17 and the shields 18 may be made to blend into one another to provide the appearance of a bumper structure having integral impact members at each end and at opposite sides of the vehicle. The supports 17 and shields 18 are constructed separately to facilitate the economical construction and insulation of the bumper exhaust structure 19 embodied in each of the sections 12 and 13.

Each bumper exhaust structure 19 embodies a plate 21 adapted to be secured to a bumper wall 22 over an elongated transversely extending opening 23 formed in the bumper wall. The plate 21 is adapted to engage the inner surface of the bumper wall 22 and the opening 23 is large enough so that the rearwardly extending parts of the bumper exhaust structure 19 will pass through the opening from the inside of each bumper section 12 or 13. Each plate 21 has an annular support 24 formed around the central part thereof, the face of which provides an annular shoulder for supporting heat, vibration and sound insulating means indicated at 26. The means 26 may be formed of a section of fabric and rubber tire carcass or other suitable material, if desired. The insulating means 26 may be cut substantially to the size of the faces of the support 24 and tabs 25 may be struck out from the face of the support for the purpose of locating the insulating means 26 on the support. The insulating means may be secured to the support by wire staples 27 extending through each corner of the insulating means and through openings in the face of the support. Each plate 21 also may be formed at the central part thereof and as an extension of the inner peripheral wall of each annular support 24 to provide exhaust conduit means 28 adapted to project through one of the elongated openings 23 in one of the bumper walls 22. The exhaust conduit means 28 may be formed of separate stampings having flanges 29 welded or otherwise suitably secured together, the assembled stampings being welded or otherwise secured in fluid tight relation to ears 20 extending within the inlet end of the conduit means 28 and from the inner peripheral edge of the annular support 24 of each plate 21. The exhaust conduit means 28 in the present instance is enlarged rearwardly beyond the bumper wall 22 and expanded horizontally of the vehicle structure to provide an elliptical exhaust gas outlet. The outlet, however, is small enough to pass through the opening 23 in the bumper wall 22 so that the structure may be assembled from the inside of each bumper section.

Surrounding and telescopically received in outlets 31 formed therein are the shields 18 forming a part of each bumper section 12 and 13. The shields 18 may be elliptical in formation to correspond in shape to the exhaust conduit means 28 and to conform to the shape of the enlarged ends of the supports 17 forming parts of the bumper sections 12 and 13. The edges of the shields 18 are adapted to engage the bumper walls 22 and to be secured rigidly thereto. For this purpose each shield 18 is provided with a pair of oppositely disposed brackets 32, each welded or otherwise secured to the inside of opposite side walls of each of the shields 18. The brackets have openings adapted to receive bolts 33 which are positioned to extend through aligned openings in the bumper walls 22 and the plates 21 formed outwardly of the openings 23 in the bumper walls 22. Nuts 34 may be tightened on the bolts 33 to secure the shields 18 and the plates 21 to opposite surfaces of the bumper walls 22. The exhaust conduit means 28, the shields 18, the plates 21, the insulating means 26 and the openings 23 in the walls 22 all may be constructed symmetrically on opposite sides of a horizontal or other plane so that the bumper exhaust structures 19 may be reversed for assembly in each bumper section and in either bumper section. The faces of the annular supports 24 may be depressed to provide oppositely extending channels 36 which, when the bumper exhaust structures are installed in either of two positions, will drain downwardly between the faces of the supports 24 and the insulating means 26 any condensate that may collect in the exhaust conduit means 28. Exhaust conduit means 37 forming the exhaust pipes leading from the engine of the motor vehicle 11 may project at the rear ends thereof through openings in the insulating means 26 to discharge the exhaust gas from the engine into the exhaust conduit means 28, and through the outlet ends of the exhaust conduit means 28 to the atmosphere. The inlet ends of the exhaust conduit means 28 may be larger than the outlet ends of the exhaust conduit means 37 to provide annular spaces therebetween. The openings in the insulating means 26 may be formed substantially to fit the exhaust conduit means 37 to support the exhaust conduit means 37 on the plates 21 and the bumper walls 22. Arcuate channels 41 may be employed in the lower parts of the openings to prevent excessive wear on the insulating means due to relative movement of the parts. Outwardly projecting dimples 38 may be provided in the outlet ends of the exhaust conduit means 28 to provide uniform spaces between the exhaust conduit means 28 and the shields 18. The dimples are adapted to engage the inwardly flanged parts of the shields 18 forming the outlets 31.

It will be apparent that the bumper exhaust structures 19 are constructed of a relatively few, simple and inexpensive parts, that the parts may be easily assembled and that the bumper exhaust structures also may be easily assembled in either end of the bumper structure of a motor vehicle in either of two positions.

The claims:

1. A bumper exhaust structure for motor vehicles and the like and comprising a bumper wall having an opening therein, a plate engaging one side of said wall and extending over a part of said opening, said plate at the central part thereof providing a passage therethrough, exhaust conduit means communicating with said passage and having an inlet end and an outlet end, insulating means supporting said exhaust conduit means and separating said exhaust conduit means from said plate and said bumper wall, a shield engaging the opposite side of said bumper wall and surrounding the outlet end of said exhaust conduit means, and means for securing said plate and said shield against opposite sides of said bumper wall.

2. A bumper exhaust structure for motor vehicles and the like and comprising a bumper wall having an opening therein, exhaust conduit means having an end extending into said opening, insulating means supporting said exhaust conduit means in said opening and spaced from said bumper wall, a shield surrounding the end of said exhaust conduit means and disposed on the side of said bumper wall receiving the discharge from said exhaust conduit means, and means securing said insulating means and said shield against opposite sides of said bumper wall.

3. A bumper exhaust structure for motor vehicles and the like and comprising a bumper wall having an opening therein, a plate extending over said opening and having a central opening therein, an annular shoulder formed around said central opening, tabs formed on said plate and extending outwardly from said plate at the outer edge of said annular shoulder, insulating means disposed within said tabs and engaging said annular shoulder and extending across said central opening, said insulating means being secured to said annular shoulder within said tabs, exhaust conduit means projecting within said central opening and through said insulating means and being supported in said central opening by said insulating means, and means for securing said plate to said wall for supporting said conduit means in said central opening in insulating relation to said wall.

4. A bumper exhaust structure for motor vehicles and the like as defined by claim 3 and in which an arcuate channel is disposed between said insulating means and said exhaust conduit means on the lower side of said exhaust conduit means for limiting wear on said insulating means by said exhaust conduit means due to relative movement between said means.

5. A bumper exhaust structure for motor vehicles and the like and comprising a bumper having a bumper wall having an opening therein, a plate engaging one side of said wall and extending over said opening, said plate having a central opening therein, at the central part thereof providing first exhaust conduit means extending from said plate and through said opening and beyond said bumper wall and having an inlet end and an outlet end, the outlet end of said first exhaust conduit means being enlarged in a plane to provide an elliptically formed outlet, a shield having an opening therein receiving the outlet end of said first exhaust conduit means in spaced relation therein, said shield being formed to surround said exhaust conduit means and to engage the opposite side of said bumper wall, means securing said shield and said plate to opposite surfaces of said bumper wall, second exhaust conduit means on the plate side of said bumper wall and having an end extending into the inlet end of said first exhaust conduit means extending from said plate, and insulating means secured to said plate and separating said first and second exhaust conduit means and supporting said second exhaust conduit means in insulated relation to said first exhaust conduit means and to said bumper.

6. A bumper exhaust structure as defined by claim 5 and in which said plate and said insulating means and said shield and said outlet end of said first exhaust conduit means are symmetrically formed on opposite sides of said plane, said structure being the same when rotated throughout 180° and installed in either of two positions on either end of said bumper.

7. A bumper exhaust structure as defined by claim 5 and in which said insulating means is secured to an annular shoulder formed on said plate around said first exhaust conduit means and in which oppositely extending depressions are formed between said shoulder and said insulating means for draining condensate from said exhaust conduit means in either of two positions.

8. A bumper exhaust structure for motor vehicles and the like and comprising a bumper including a bumper wall having an opening therein, a plate engaging one side of said wall and extending over said opening, said plate having an opening formed centrally therein, first exhaust conduit means extending from said plate and through said last mentioned opening and beyond said bumper wall, a shield having an opening therein communicating with the end of said first exhaust conduit means beyond said bumper wall, said shield being formed to surround said exhaust conduit means and to engage the opposite side of said bumper wall, means securing said shield and said plate to opposite surfaces of said bumper wall, second exhaust conduit means on the plate side of said bumper wall and having an end extending into said first exhaust conduit means, and insulating means secured to said plate and supporting one of said exhaust conduit means and separating said first and second exhaust conduit means and supporting said one exhaust conduit means in insulated relation to the other of said exhaust conduit means and to said bumper.

9. A bumper exhaust structure for motor vehicles and the like and comprising a bumper including a bumper wall having an opening therein, a plate engaging one side of said wall and extending over said opening, said plate having an opening formed centrally therein, first exhaust conduit means extending from said plate and through said last mentioned opening and beyond said bumper wall, a shield having an opening therein communicating with the end of said first exhaust conduit means beyond said bumper wall, said shield being formed to surround said exhaust conduit means and to engage the opposite side of said bumper wall, means securing said shield and said plate to opposite surfaces of said bumper wall, second exhaust conduit means on the plate side of said bumper wall and having an end communicating with said first conduit means, and insulating means separating said first and second exhaust conduit means and supporting said second exhaust conduit means in insulated relation to said bumper wall.

References Cited in the file of this patent

UNITED STATES PATENTS

| | | | |
|---|---|---|---|
| Re. 20,905 | Swan | Nov. 1, | 1938 |
| 1,856,005 | Tomshow | Apr. 26, | 1932 |
| 2,407,400 | Chamberlain | Sept. 10, | 1946 |
| 2,515,391 | Arbib | July 18, | 1950 |
| 2,568,409 | Philllips | Sept. 18, | 1951 |
| 2,613,099 | Arbib | Oct. 7, | 1952 |
| 2,647,533 | Beyner | Aug. 4, | 1953 |
| 2,729,500 | Dickenshied et al. | Jan. 3, | 1956 |
| 2,733,668 | Pfetzing | Feb. 7, | 1956 |
| 2,841,232 | Loeffler | July 1, | 1958 |
| 2,841,348 | Stahlhuth | July 1, | 1958 |
| 2,850,314 | Haigh et al. | Sept. 2, | 1958 |